H. CADWALLADER, Jr.
MACHINE BOLT.
APPLICATION FILED MAR. 7, 1917.
1,282,538.
Patented Oct. 22, 1918.
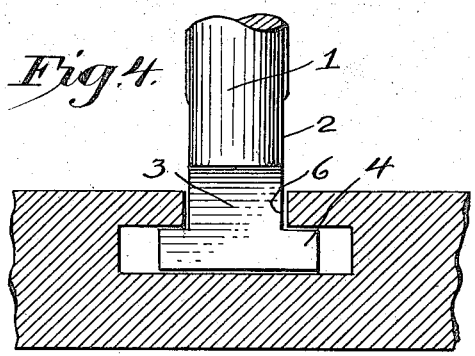
Fig. 4.
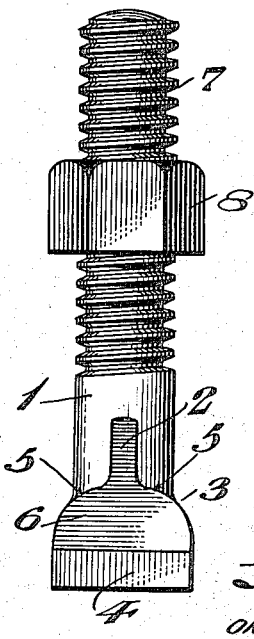
Fig. 1.
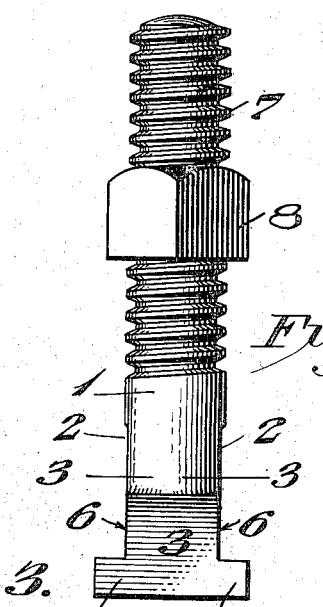
Fig. 2.
Fig. 3.
ON LINE. 3—3. FIG. 2.
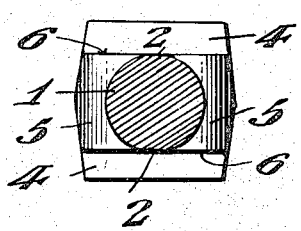
WITNESSES:
William J. Jackson
Helen M. Byrne
INVENTOR
Harry Cadwallader, Jr.
BY
Robert M. Barr
ATTORNEY.

UNITED STATES PATENT OFFICE.

HARRY CADWALLADER, JR., OF PHILADELPHIA, PENNSYLVANIA.

MACHINE-BOLT.

1,282,538.

Specification of Letters Patent.   Patented Oct. 22, 1918.

Application filed March 7, 1917.   Serial No. 152,986.

*To all whom it may concern:*

Be it known that I, HARRY CADWALLADER, Jr., a citizen of the United States, residing at Philadelphia, in the county of Philadelphia and State of Pennsylvania, have invented a certain new and useful Improvement in Machine-Bolts, of which the following is a specification.

The present invention relates to bolts and more particularly to a T-head bolt for use in connection with the undercut groove of a machine bed, such as a planer or milling machine or the like and has for an object to provide a bolt formed by the drop forging process in which the head and its associated adjuncts of the bolt are formed and proportioned in such a manner as to distribute the strain and provide a strong and efficient bolt for the purpose intended.

In T-head bolts which have heretofore been used by the trade, it has been found that the bolt has a tendency to and does turn in its groove so that sections of the machine bed or table are frequently broken out, and furthermore, the general oversize dimension of the bolt section and head makes a machining operation necessary where it is desired to use the bolt interchangeably with another machine bed.

It is the object of the invention, therefore, to overcome the foregoing defects by providing a bolt formed by drop forging in suitably constructed dies whereby the metal is caused to flow in the required manner to provide an excess portion in the head and thereby make it possible to form a double offset upon the head, one part of which seats within the undercut groove of the machine table, while the other part fits the slot leading to the undercut groove and provides a substantially flat surface which contacts with the abutting walls of the slot to prevent turning of the bolt when it is in use.

Referring to the drawings:

Figure 1 represents a front elevation of a bolt embodying my invention.

Fig. 2 represents a side elevation of the same;

Fig. 3 represents a section on line 3—3 of Fig. 2.

Fig. 4 represents a detail showing the bolt in use in an undercut groove.

1 designates the shank of the bolt, the same being formed of a suitable diameter according to the size desired and to the dimensions of the dies employed and having a reduced portion 2 at opposite sides which joins the head 3. As here shown, the head 3 in side elevation, has an offset 4 at each side adapted to seat within and also slide as required within the undercut groove with which the bolt is adapted to be used. It will be noted that the reduced portion 2 of the shank 1 is continued into the head portion so that the latter, in side elevation, is of substantially the same diameter and this diameter, for any particular bolt, corresponds substantially to the slot in the machine bed or table which opens into the undercut groove, above referred to, and in which the offsets 4 are seated or ride.

In front elevation as shown in Fig. 1, it will be noted that the two opposite sides of the head 3 respectively curve laterally outward and downward from the shank 1 and the curved surfaces 5 thus formed merge into and continue as plane surfaces having a length the same as the thickness of the offsets 4. Thus the head of the bolt is provided with a reinforcing part which backs up or strengthens the offsets 4 and also forms a relatively long plane surface 6 at each side of the surfaces 5, which surfaces abut the walls of the slot in the table and effectually prevent turning or twisting of the bolt when it is in use. Furthermore, the curving of the surfaces 5 on a suitable radius eliminates the trouble incident to forcing the metal to form a sharp corner edge and results in a considerable reduction in the amount of metal required to be pressed into shape by the forging process and consequently the manufacture of a T-head bolt by the use of dies becomes economically possible.

In the present instance the thickness of the surfaces 5 is the same as the reduced diameter 2—2 of the body of the shank so that the entire length of the reduced and flat portion of the shank is sufficient to permit the bolt to be used with substantially all the ordinary slots in machine tables and prevent the bolt from turning. It is, of course, well known that the diameter of the under-cut grooves and slots of machine tables vary to a certain extent and the diameter of the reduced portion of the shank permits the bolt to be used with practically all ordinary widths of slots while the length of the reduced portion insures the bolt head being properly seated within the under-cut groove, irrespective of the depth of the slot.

The laterally curved surfaces giving an excess of metal at each side of the shank in order to fit the slot of the undercut grooves it is evident that the bolt is very effectually prevented from turning in the table slot and consequently the pull of the head is uniformly distributed against the groove wall and the tendency for any section of the machine table to shear or break is reduced to a minimum.

7 designates the threaded portion of the bolt shank upon which is fitted the nut 8 to form the clamping element of the bolt and in this instance the thread is a specially cut thread of relatively long pitch, whereby the nut has a considerable bearing and the construction is well adapted to withstand or prevent stripping of the thread.

It will now be apparent that I have devised a complete bolt suitable as a standard for use with practically all undercut grooves of planer tables, milling machine beds and the like and wherein the head is drop forged to give an excess of metal at the rear of the main T offset and also providing a reduced diameter of the shaft to fit any slot opening into the aforesaid groove. Bolts of the T-head type, as heretofore constructed, have been machined in the shops for the particular groove they are to fit and are therefore expensive and are not adapted to be used interchangeably with other machine grooves. Furthermore, an ordinary T-head bolt is offset directly from the shank and as this latter is not provided with flat surfaces, the bolt may readily turn and shift the square head part so that only the corners of the bolt head have a bearing beneath the overhung portion of the groove so that the strain is unevenly distributed or distributed over a less area than when the bolt is in its proper position and frequently the machine table is broken or cracked.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification within the scope of the appended claims.

What I claim is:

1. In a drop forged bolt, a shank provided with a threaded portion and a relatively long unthreaded portion, said unthreaded portion being provided with two opposite plane surfaces lying in parallel planes, a head formed integral with said shank having two opposite offsets extending at right angles to said shank surfaces and a pair of laterally extending downwardly curved surfaces bounding the upper part of said head and located between the shank plane surfaces.

2. In a drop forged bolt, a shank, a head formed thereon having two oppositely disposed offsets at its lower end and an excess of material at its upper end, said excess head portion having two parallel plane surfaces and two laterally extending downwardly curved surfaces, said plane surfaces being at right angles to said offsets, said shank having a pair of parallel plane surfaces above said head forming respectively continuations of said head plane surfaces and the thickness of the material between said plane surfaces being less than the diameter of said shank.

In testimony whereof, I have hereunto signed my name.

HARRY CADWALLADER, Jr.